Sept. 14, 1965  F. CLYNCH  3,205,971
SUSPENSION AND ISOLATION SYSTEM FOR SEISMIC
SHEAR WAVE TRANSDUCERS
Filed Nov. 15, 1962  2 Sheets-Sheet 1

INVENTOR.
FRANCH CLYNCH
BY
ATTORNEY

Sept. 14, 1965  F. CLYNCH  3,205,971
SUSPENSION AND ISOLATION SYSTEM FOR SEISMIC
SHEAR WAVE TRANSDUCERS
Filed Nov. 15, 1962  2 Sheets-Sheet 2

INVENTOR.
FRANK CLYNCH
BY
ATTORNEY

United States Patent Office 3,205,971
Patented Sept. 14, 1965

3,205,971
SUSPENSION AND ISOLATION SYSTEM FOR SEISMIC SHEAR WAVE TRANSDUCERS
Frank Clynch, Ponca City, Okla., assignor to Continental Oil Company, Ponca City, Okla., a corporation of Delaware
Filed Nov. 15, 1962, Ser. No. 237,901
8 Claims. (Cl. 181—.5)

The present invention relates to transducers for inducing a signal in an elastic medium and more particularly, but not by way of limitation, relates to an improved suspension and isolation system for a transducer specially adapted to induce seismic shear waves in the earth for seismic exploration purposes.

The present invention is an improvement over that disclosed and claimed in copending U.S. application Serial No. 237,540, filed November 14, 1962, now Patent No. 3,159,233, by Clynch et al., and assigned to the assignee of the present invention. The transducer described in the referenced application comprised an earth coupling member for engaging the surface of the ground and a reaction mass member which were interconnected by a linear actuator for reciprocating the reaction mass along a horizontally disposed axis of reciprocation. A static holddown load is applied to the coupling member by a pair of hydraulically activated post means lowered from a transporting truck. The post means include a plurality of pneumatically inflated cushion means for absorbing and cushioning any vertical components of motion which the transducer may generate. The transducer is raised for transport by the post means through a plurality of tension members which loosely interconnect the vertical post means and the earth coupling member and serve as a linkage bypassing the cushion means which has a low tensile strength. Therefore, when the load is applied to the pneumatic cushions, the cushions are compressed and the tension members are loose such that the earth coupling member is somewhat free to move in the horizontal direction due to the fact that the cushions will roll to a certain extent. Under ideal operating conditions, the coupling member will remain securely connected to the surface of the earth and accordingly will not reciprocate in the horizontal direction excessively. However, the earth coupling plate occasionally becomes uncoupled during operation and overtravels the limits of play permitted by the tension members so as to apply severe vibrations through the vertical post members to the transporting vehicle. This undesirable situation becomes particularly acute in cases where the transducer is coupled to a sloping surface. Then when the transporting vehicle is raised from the ground in order to apply a static load through the upright post means to the coupling plate member, the vehicle will automatically tend to skid downhill until the tension members are taut. Of course any appreciable horizontal movement of the coupling plate member then immediately transmits a strong vibratory force to the vehicle. This effect is somewhat reduced by a plurality of horizontally oriented coil springs disposed on either side of the coupling plate member of the transducer and acting on the adjacent post means to produce a bias tending to maintain the transducer centered between the upright post members. Although these springs were in general adequate to maintain the transducer coupling plate member centered within the limits of travel imposed by the loose tension members so long as the device was operated on level ground, whenever the transducer was operated on sloping ground a sufficient restraining force was not available to maintain the coupling plate member centered. The length of the tension members could not be increased because of the likelihood of damage to the cushion means as the transducer was raised for transport.

Therefore, it is an important object of the present invention to provide an improved suspension and isolation system for a seismic shear wave transducer which will more effectively isolate horizontal motion of the transducer from the transporting vehicle under all conditions of operation without materially affecting the frequency content of the seismic wave generated by the transducer.

Another object of the present invention is to provide a system for both applying a static holddown load to the transducer by means of the weight of the vehicle and also raising the transducer for transport by the vehicle without interfering with the normal operation of the transducer.

Still another object of the present invention is to provide adjustable means for maintaining the transducer in a predetermined position relative to the transporting vehicle even when the transducer is disposed on a sloping surface and a portion of the vehicle raised to apply a static holddown load to the transducer.

Many additional objects and advantages of the present invention will be evident to those skilled in the art from the following detailed description and drawings, wherein.

Figure 1:
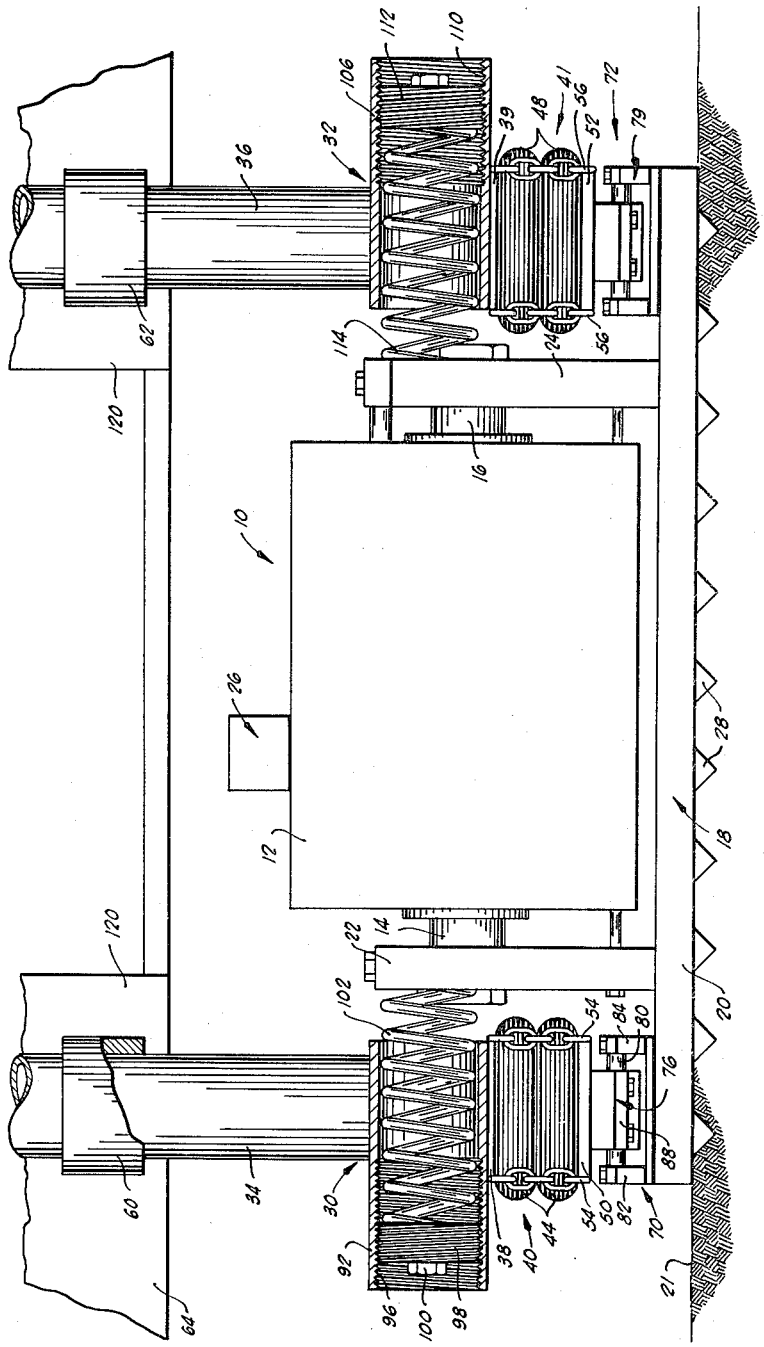
FIG. 1 is a side elevation, partially in section, of a suspension and isolation system constructed in accordance with the present invention.

Referring now to the drawings, a seismic shear wave transducer is indicated generally by the reference numeral 10. The seismic transducer 10 may be of the type disclosed in the above-referenced copending application and the transducer does not, per se, comprise a part of the present invention. The transducer 10 is comprised of a reaction mass member 12 in which is formed a hydraulic cylinder for receiving a double rod piston member having oppositely extending piston rods 14 and 16. The ends of the piston rods 14 and 16 are interconnected by a coupling plate member, indicated generally by the reference numeral 18, comprising a coupling plate 20 for engaging the surface 21 of the earth, and a pair of upright plate members 22 and 24 which are connected to the piston rods 14 and 16. The coupling plate 20 is connected to the ground by a plurality of projections 28 which in practice may vary in size over a considerable range depending upon the character of the surface to which the plate is to be coupled. Upon actuation of the transducer 10 by introduction of hydraulic power fluid through a control valve means 26, the reaction mass member 12 is made to reciprocate along the piston rods 14 and 16, which may then be considered a horizontally disposed axis of reciprocation, and produce a seismic shear wave of controlled frequency content, as described in greater detail in the above-referenced application.

A pair of upright post means, indicated generally by the reference numerals 30 and 32, are comprised of tubular posts 34 and 36 to which transverse upper channel members 38 and 39 are welded or otherwise connected to the lower ends thereof. The post means 30 and 32 also include suitable vibration absorbing means, indicated generally by the reference numerals 40 and 41, respectively, for absorbing vertical components of vibration and shock which may be generated by operation of the transducer and rapid lowering of the transducer to the ground. The vibration absorbing means 40 may conveniently comprise two pairs of pneumatically inflated pillow cushions 42 and 44, and the vibration absorbing means 41 may conveniently comprise two similar pairs of pneumatically inflated pillow cushions 46 and 48. The pair of pillow cushions 42 are vulcanized together and to both the upper channel member 38 and to a lower channel member 50, and the pair of pillow cushions 44 are similarly vulcanized together and to the other end of the upper channel member 38 and lower channel member 50. The two pairs of pneumatic pillow cushions 46 and 48 are vulcanized together and to the transverse upper channel member 39 and to a transverse lower channel member 52, respectively. A suitable tension means, such as six chains 54, interconnect the upper channel member 38 and the lower channel member 50 to provide a tension link around the pillow cushions which have a low tensile strength. Similar tension means comprised of six chains 56 interconnect the upper channel member 39 and the lower channel member 52. The posts 34 and 36 extend upwardly through suitable bushings 60 and 62, respectively, which may be welded or otherwise connected to the chassis 64 of a transporting vehicle and are connected to suitable hydraulic actuating means (not shown) for raising and lowering the posts 34 and 36 which is carried by the vehicle. Thus it will be noted that when a vertical force is applied downwardly on the posts 34 and 36, the force will be transmitted through the several pneumatically inflated pillow cushions to the lower channel members 50 and 52. When an upward vertical force is applied to the posts 34 and 36, the tension force will be transmitted through the tension members 54 and 56, respectively, to the lower channel members 50 and 52.

Suitable linear bearing means, indicated generally by the reference numerals 70 and 72, are disposed between the lower channel members 50 and 52 and the coupling plate 20 to provide free linear motion between the lower ends of the post means 30 and 32 and the coupling member 18, as will presently be described. The linear bearing means 70 may conveniently be comprised of a pair of rod and bushing bearing assemblies 74 and 76 which are transversely spaced beneath the lower channel member 50 as illustrated in FIG. 3 and in dotted outline in FIG. 2. A similar pair of rod and bushing bearing assemblies 78 and 79 are transversely spaced at opposite ends of the other lower chanel member 52. Each of the rod and bushing bearing assemblies is of identical construction and for convenience of illustration only the assembly 76 will be described in detail.

Figure 3:
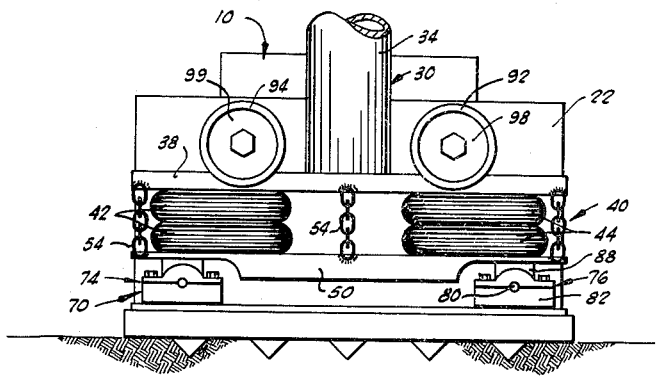
FIG. 3 is an end view of the device of FIG. 1.
Figure 4:
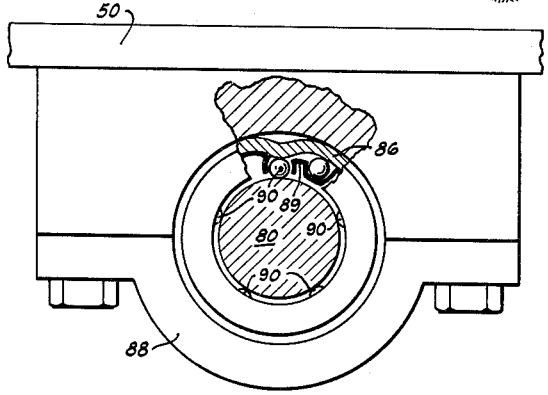
FIG. 4 is an enlarged view, partially in section, of a preferred linear bearing means used in the transducer suspension and isolation system constructed in accordance with the present invention.

Referring now to FIGS. 1, 3 and 4, the rod and bushing bearing assembly 76 is comprised of an elongated cylindrical rod 80 which is connected to the coupling plate 20 by means of a pair of pillow blocks 82 and 84. The rod 80 is disposed parallel to the piston rods 14 and 16 of the transducer 10 and accordingly is disposed parallel to the axis of reciprocation of the reaction mass member 12. Of course it is to be understood that the rods of the other rod and bushing bearing assemblies 74, 78 and 79 are also disposed parallel to the axis of reciprocation of the reaction mass member 12. A bushing 86 (see FIG. 4) is disposed around the rod connected to the lower channel member 50 by a conventional pillow block 88. The bushing 86 is preferably of the ball type which may be purchased under the trade name Ball Bushing from Thompson Industries, Inc., Manhasset, New York. The ball bushing has a plurality of oval-shaped ball retaining races 89 which are disposed within a sleeve such that only the balls 90 along one side of the oval and aligned parallel to the rod 80 are in contact with the rod 80. The plurality of ball retaining races are so disposed that five sets of balls 90 are in contact with the rod 80 and accordingly transmit a load applied to the bearing sleeve from any direction to the rod 80. Thus it will be noted that the rod 80 and hence the coupling plate 20 are free to move relative to the bushing 86 and hence to the post means 30 in a direction parallel to the axis of reciprocation of the reaction mass member 12, and yet a static holddown load can be applied to the coupling plate 20 or the transducer 10 can be lifted by forces transmitted through the linear bearing means. Of course it is to be understood that any type of linear bearing may be substituted for the rod and ball bushing type bearing without departing from the scope of the present invention.

Figure 2:
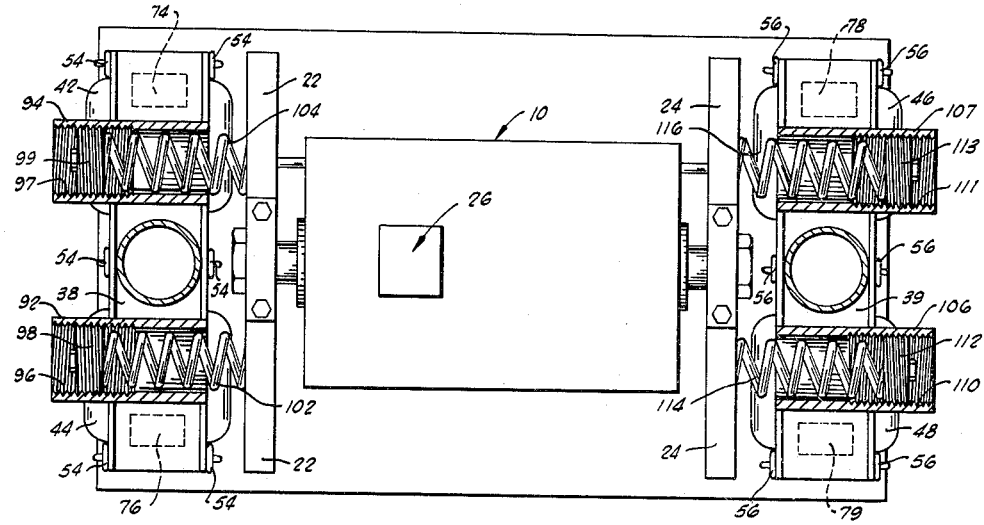
FIG. 2 is a plan view of the device of FIG. 1.

A pair of spring wells are formed by tubular sleeves 92 and 94 which are welded or otherwise suitably connected to the transverse upper channel member 38 and are provided with internal threads 96 and 97 adjacent the outer ends thereof, as illustrated in FIGS. 1 and 2. Plug members 98 and 99 are threaded into the sleeves 92 and 94, respectively, to form the ends of the respective spring wells. The threaded plug members 98 and 99 are preferably provided with suitable means such as hexagonal nuts 100 and 101 which can be engaged by a wrench so that the plug members may be rotated in the sleeves to vary the depths of the respective spring wells for adjustment purposes hereafter described in greater detail. Coil springs 102 and 104 are disposed in the tubular sleeves 92 and 94, respectively, and are compressed between the plug members 98 and 99 and the upright plate members 22 and 24 of the coupling plate member 18 to exert a bias force on the coupling plate member as hereafter described in greater detail. A similar pair of spring wells are formed by tubular sleeves 106 and 107 which are welded or otherwise connected to the transverse lower channels 39 and are also provided with internal threads 110 and 111 to receive threaded plug members 112 and 113 as illustrated in FIG. 2. Coil springs 114 and 116 are disposed in the sleeves 106 and 107, respectively, and are compressed between the respective plug members 112 and 113 and the upright plate member 24 of the coupling plate member 18 to exert a biasing force on the coupling plate member 18 opposite to that exerted by the springs 102 and 104 to maintain the coupling plate in a predetermined position relative to the post means 30 and 32 as hereinafter described in greater detail.

When being transported by the vehicle, the transducer 10 is lifted from the ground by the post means 30 and 32 until the upper end of the reaction mass member 12 extends into the opening 120 in the vehicle chassis. When in this position, the several chains 54 and 56 are taut and support the weight of the transducer 10 without any tension force being applied to the inflated pillow cushions. The rod and bushing bearing assemblies 74, 76, 78 and 79 transmit the supporting tension force. When it is desired to induce a seismic signal in the earth, the mechanism carried by the vehicle is actuated in such a manner as to lower the post means 30 and 32 until the coupling plate 20 engages the ground. As the coupling plate 20 strikes the ground, the inflated pillow cushions will act as shock absorbers. The post means 30 and 32 are then lowered further with respect to the vehicle chassis until a substantial portion of the weight of the vehicle is transmitted through the posts 34 and 36, the upper channel members 38 and 39, the pneumatic pillow cushions 42, 44, 46 and 48, the lower channel members 50 and 52 and the linear bearing assemblies 74, 76, 78 and 79 to apply a static load to the coupling plate 20 and thereby press the projections 28 into the ground and hold the coupling member against the ground during operation. The pneumatic pillow cushions 42, 44, 46 and 48 will then absorb all vertical components of motion which may be generated due to the transducer 10 rocking about a transverse axis perpendicular to the piston rods 14 and 16 as occasionally occurs when only four large, pyramidal-shaped projections 28 are utilized in soft soil. Yet the coupling plate member 18 is free to reciprocate in a horizontal direction parallel to the axis of reciprocation of the reaction mass member 12 because of the linear bearing means 70 and 72. The springs 102, 104, 114 and 116 will maintain the coupling plate member 18 substantially centered between the post means 30 and 32 such that the pillow blocks 88 will not strike either of the pillow blocks 82 and 84 of the respective linear bearings while the transducer is being transported and insures that the transducer will be properly centered as it is lowered to the ground.

During normal operation, the coupling plate member 18 will not reciprocate to any appreciable extent so long as it is securely coupled to the earth by the projections 28. However, should the coupling plate 20 become uncoupled due to the projections 28 working loose in the soil, or for some other reason, the coupling plate member 18 will sometimes be reciprocated through far greater limits of travel than the reaction mass member 12 because the reaction mass member is several times heavier than the coupling plate member. Even so, as long as the transducer is substantially centered between the post means 30 and 32, the pillow blocks of the several linear bearing means will not come in contact. However, in many cases the surface to which the transducer 10 is coupled slopes from the horizontal. In such a case, when the rear end of the vehicle is raised from the ground in order to apply the static load to the coupling plate 20, if not for the springs 102 and 104, or 114 and 116, the linear bearing means would otherwise permit the truck to shift to the downhill side until the pillow block 88 of the respective linear bearings strikes one of the associated pillow blocks 82 or 84, depending upon the direction in which the surface slopes. However, the springs 102, 104, 114 and 116 are preferably precompressed sufficiently to prevent the vehicle and therefore the post means 30 and 32 from shifting and thereby maintain the transducer 10 substantially centered. This can easily be accomplished on gently sloping surfaces by placing a timber under the righthand end of the coupling plate 20, referring to FIG. 1, and lifting the rear end of the vehicle from the ground in order to apply a static load to the transducer coupling plate member 18 as previously described. The vehicle will automatically shift to the left against the compression of the springs 114 and 116 until the pillow blocks 88 contact the pillow blocks 84. Then the plug members 112 and 113 in the sleves 106 and 107, respectively, are rotated to adjust the depths of the spring wells and consequently the compression of the respective springs 114 and 116 until the post means 30 and 32 and the vehicle to which they are connected are moved back to the left and the transducer 10 substantially centered with respect to the post means. The transducer 10 is then momentarily raised from the ground and the timber inserted under the lefthand end of the coupling plate 20. When the static load is again applied to the coupling plate 20 and the rear of the vehicle raised, the vehicle and the post means 30 and 32 will shift to the right against the compression of the springs 102 and 104. The plug members 98 and 99 in the sleeves 92 and 94 may then be screwed into the respective sleeves until the compression of the respective springs is increased and the resulting increased biasing force repositions the post means 30 and 32 and the vehicle to the point where the transducer 10 is centered between the posts. It may be necessary to repeat this procedure a few times until the springs on opposit sides of the transducer 10 are equally compressed to a sufficient extent as to maintain the transducer 10 substantially centered between the post means so long as the slope of the ground does not exced a reasonable degree. In the event it is desired to couple the transducer 10 to a more steeply sloping surface, the plugs in the sleeves 92, 94, 106 and 107 may then be readjusted to center the transducer 10 between the post means 30 and 32 such that the rod and bushing bearing assemblies 74, 76, 78 and 79 will not be damaged by overtravel.

Although a preferred embodiment of the present invention has been described in detail, it is to be understood that various changes, substitutions and alterations can be made therein without departing from the spirit and scope of the invention as defined in the appended claims.

What is claimed is:

1. An improved vibration isolation system for a shear wave seismic transducer transported by a vehicle and having a generally horizontally disposed coupling plate member, a reaction mass member, and linear actuator means interconnecting the coupling plate member and the reaction mass member for reciprocating the reaction mass member relative to the coupling plate member along a horizontal axis of reciprocation, the vibration isolation system comprising:

at least one linear bearing means interconnecting the coupling plate and the transporting vehicle for transmitting vertical forces from the truck to the coupling plate member, the linear bearing means having an axis of travel disposed parallel to the axis of reciprocation of the reaction mass member;

coupling plate member biasing means operatively mounted between said truck and said linear bearing means; and spring means secured between said biasing means and said coupling plate member for exerting a biasing force tending to maintain the coupling plate member at a predetermined position with respect to the vehicle and within the travel limits of the linear bearing means.

2. An improved vibration isolation system as defined in claim 1 wherein:

the spring means operatively interconnecting the biasing means and the coupling plate member is manually adjustable to vary the magnitude of the biasing force and thereby vary the position of the coupling plate member relative to the vehicle.

3. An improved suspension and vibration isolation system for a shear wave seismic transducer transported by a vehicle and having a generally horizontally disposed coupling plate member, a reaction mass member and a linear actuator means interconnecting the coupling plate member and the reaction mass member for reciprocating the reaction mass member relative to the coupling plate member along a horizontal axis of reciprocation, the suspension and vibration isolation system comprising:

a pair of raisable and lowerable post means connected to the vehicle and extending downwardly to points on opposite sides of and above the coupling plate member;

linear bearing means interconnecting each of the post means and the coupling plate member for transmitting vertical forces from the posts to the coupling plate member, the linear bearing means having axes of travel disposed parallel to the axis of reciprocation of the reaction mass member; and, spring means operatively connected between each of the post means and the coupling plate member for exerting a biasing force on the coupling plate member tending to maintain the coupling plate member within predetermined travel limits between the post means.

4. An improved suspension and vibration isolation system for a shear wave seismic transducer transported by a vehicle and having a generally horizontally disposed coupling plate member, a reaction mass member and a linear actuator means interconnecting the coupling plate member and the reaction mass member for reciprocating the reaction mass member relative to the coupling plate member along a horizontal axis of reciprocation as defined in claim 3 wherein each of the spring means comprises:

a spring disposed between the respective post means and the coupling plate member, for exerting biasing forces in opposite directions parallel to the axis of reciprocation of the reaction mass member; and, means for adjusting the magnitude of the biasing forces of the spring means whereby the coupling plate member will be maintained in centered position between the post means.

5. An improved suspension and vibration isolation system for a shear wave seismic transducer transported by a vehicle and having a generally horizontally disposed coupling plate member, a reaction mass member and a linear actuator means interconnecting the coupling plate member and the reaction mass member for reciprocating the reaction mass member relative to the coupling plate member along a horizontal axis of reciprocation as defined in claim 3 wherein each of the spring means comprises:

an internally threaded sleeve means connected to each post means and aligned generally parallel to the axis of reciprocation of the reaction mass member;

plug means threaded into each sleeve means to form a spring well of variable depth;

a coil compression spring disposed in each spring well, the coil compression spring being in contact with the plug and in contact with the coupling plate member for exerting a biasing force on the coupling plate member, whereby the plug means in each spring well may be rotated to adjust the biasing force exerted by the respective spring on the coupling plate member until the coupling plate member tends to be maintained in centered position between the post means.

6. An improved suspension and vibration isolation system for a shear wave seismic transducer transported by a vehicle and having a generally horizontally disposed coupling plate member, a reaction mass member and a linear actuator means interconnecting the coupling plate member and the reaction mass member for reciprocating the reaction mass member relative to the coupling plate member along a horizontal axis of reciprocation as defined in claim 3 wherein each of the post means is further characterized by:

shock absorber means for transmitting a static load to the linear bearing means associated with the respective post means while absorbing vertical components of vibrations induced in the coupling plate member by reciprocation of the reaction mass member.

7. An improved suspension and vibration isolation system for a shear wave seismic transducer transported by a vehicle and having a generally horizontally disposed coupling plate member, a reaction mass member and a linear actuator means interconnecting the coupling plate member and the reaction mass member for reciprocating the reaction mass member relative to the coupling plate member along a horizontal axis of reciprocation as defined in claim 3 wherein:

each of the post means is further characterized by an elongated member disposed at the lower end thereof and extending transversely of the axis of reciprocation of the reaction mass member; and the linear bearing means interconnecting each of the post means and the coupling plate member is comprised of a pair of rod and bushing linear bearing assemblies.

8. An improved suspension and vibration isolation system for a shear wave seismic transducer transported by a vehicle and having a generally horizontally disposed coupling plate member, a reaction mass member and a linear actuator means interconnecting the coupling plate member and the reaction mass member for reciprocating the reaction mass member relative to the coupling plate member along a horizontal axis of reciprocation as defined in claim 7 wherein:

each of the linear bearing means is comprised of a rod and ball bushing assembly.

References Cited by the Examiner

UNITED STATES PATENTS 3,024,861   3/62   Clynch _____ 181—.5

SAMUEL FEINBERG, *Primary Examiner.*

CHESTER L. JUSTUS, *Examiner.*